United States Patent [19]

Prosise

[11] Patent Number: 4,937,086

[45] Date of Patent: Jun. 26, 1990

[54] PROCESS FOR PREPARING REDUCED FAT DONUTS HAVING A UNIFORM TEXTURE

[75] Inventor: William E. Prosise, Ramsey, N.J.

[73] Assignee: GAF Chemicals Corporation, Wayne, N.J.

[21] Appl. No.: 370,482

[22] Filed: Jun. 23, 1989

[51] Int. Cl.⁵ .............................................. A23L 1/307
[52] U.S. Cl. .................................... 426/439; 426/549; 426/19; 426/804
[58] Field of Search ............... 426/549, 551, 552, 554, 426/555, 439, 804, 19

[56] References Cited

U.S. PATENT DOCUMENTS

| | | | |
|---|---|---|---|
| 3,153,595 | 10/1964 | Tiedemann | 426/554 |
| 3,481,745 | 12/1969 | Borer et al. | 426/554 |
| 3,526,516 | 9/1970 | Howard et al. | 426/331 |

FOREIGN PATENT DOCUMENTS 1053127 12/1960 United Kingdom .

Primary Examiner—Donald E. Czaja
Assistant Examiner—Evan Federman
Attorney, Agent, or Firm—Walter Katz; Marilyn J. Maue; Joshua J. Ward

[57] ABSTRACT

A process for preparing donuts having reduced fat and substantially uniform texture is described herein. The process includes providing a donut mix containing about 0.2–10% by weight of polyvinylpyrrolidone blending with water, making donut shaped forms therefrom, and cooking by submersion in heated edible fat.

3 Claims, No Drawings

PROCESS FOR PREPARING REDUCED FAT DONUTS HAVING A UNIFORM TEXTURE

BACKGROUND OF THE INVENTION

1. Field of the Invention

This invention relates to donuts, and, more particularly, to reduced fat donuts having a uniform texture.

2. Description of the Prior Art

Donuts differ from other bakery foods in that they are cooked by submersion in heated edible fat rather than baked in supporting containers in ovens. In contrast to oven baking in which the required heat energy is transmitted variously by radiation, convection and conduction, the heating fat in the frying process not only serves as an energy transferring medium but also enters into and becomes an intrinsic part of the finished product. Hence, the ultimate character of donuts is established not only by the quality of their formula ingredients and the method of their processing, but also to a substantial degree by the quality of the frying medium.

CAKE DONUTS

Cake donuts are produced from batters which in many essentials resemble layer-cake batters. They are scaled or cut into small ring-shaped forms, each weighing from 0.5 to 2 oz, and are deposited into heated shortening for 1 to 2.5 min, or until they are properly cooked. When correctly formulated and properly fried, they are characterized by (a) a rich, golden-brown exterior color that has both eye appeal and conveys an image of quality, (b) a crisp crust that is formed by the dehydration of the outer portion of the donut, and (c) an inner core that comprises the major quantitative portion and resembles a baked product more than a fried food. The 25 to 30% moisture retained by the core during frying will ultimately migrate outward during storage and alter the crispy character of the freshly-fried crust.

The external properties of the donuts are influenced primarily by the frying conditions, i.e., the temperature of the frying medium, which is maintained within a range of 360°–380° F., and the frying time, which, depending on the type and size of the donuts being produced, will range from about 1 to 3 minutes.

Donuts may be formulated in several ways, e.g., by weighing out the formula's individual ingredients, by the use of proprietary bases to which are added flour and water and possibly a few optional ingredients, or by the use of commercially-formulated proprietary mixes that require only the addition of water. Most donuts produced commercially are made from some form of prepared mixes as these offer the advantages of uniformity of composition, a predetermined degree of richness, a largely predictable production performance, and major economies in labor by eliminating numerous scaling operations in the bakery.

A typical donut mix is based on a blend of cake and bread flours with the appropriate flour strength in terms of protein content. It can contain finely granulated sugar as the principal sweetener, nonfat dry milk, shortening, egg yolk solids, and defatted soy flour. Aeration of the donut batter during frying is derived largely from chemical leavening agents.

Production is initiated by mixing the dry ingredients with water into a uniform batter with a temperature in the range of 75° to 80° F.

Fat absorption is about 20% for standard donut varieties, 24 to 26% for old-fashioned donuts, and 28 to 32% for crullers.

YEAST-RAISED DONUTS

Yeast-raised donuts differ from cake donuts by being made from a yeast-fermented dough rather than a chemically-leavened batter and by receiving a final proof before they are deposited into the fryer. As a result, their requirements with respect to formulation, ingredient functions, method of processing and type of equipment differ also from those of cake donuts.

The basic formula for yeast-raised donuts may be augmented by the addition of such functional ingredients as yeast food, dough conditioners, emulsifiers, flavors, etc.

FAT ABSORPTION

During the frying process, fat is removed from the frying medium in two ways: (a) by absorption or penetration of the fat into the frying product, principally the forming crust where it plays a primary role in influencing the latter's character; and (b) by adsorption that involves only the fat that adheres to the exterior surface of the crust without becoming an integral part of it.

Fat absorption is a significant factor in donut quality as it contributes richness of flavor, improves mouthfeel and eating quality, and extends the product's shelf life. Donuts with insufficient fat absorption generally possess a pasty texture and eating quality, whereas products with too much fat absorption acquire a greasy taste in which the flavor of the fat predominates.

OBJECT OF THE INVENTION

Accordingly, it is an object of this invention to provide reduced fat donuts which have a uniform texture but do not have a pasty or greasy taste.

These and other objects and features of the invention will be made apparent from the following description of the invention.

SUMMARY OF THE INVENTION

What is described are reduced fat donuts which are uniform in texture and do not have a pasty or greasy taste. The donuts of the invention are characterized by containing about 0.1 to 8% by weight of polyvinylpyrrolidone (PVP). In accordance with the invention, a donut mix or batter is provided for making such reduced fat donuts. Typical mixes include cake and yeast-raised donut mixes containing about 0.2 to 10% by weight of PVP.

DESCRIPTION OF THE INVENTION

The reduced fat donuts of the invention are prepared from conventional cake and cruller donut mixes, or raised donut mixes, except that PVP is included in the mix, or added by solution. The amount of PVP added to the mix is calculated to provide a PVP content in the finished donut of about 0.1–8% by weight preferably 0.5–3%. Generally about 0.2–10% PVP is added to the mix. Donut batters contain, in addition to the PVP, about 15–40% water.

Suitable PVP polymers utilizable herein are those having a purity sufficient for use as a food additive. The molecular weight of the PVP used is generally in the range of about $M_w = 1 \times 10^3$ to $2 \times 10^6$ (K-12 to K-120), and, preferably about 2,000 to 70,000.

The invention will now be illustrated by reference to the following examples.

EXAMPLE 1

Reduced Fat Yeast-Raised Donuts

Two formulations of yeast-raised donut mixes were prepared. Mix "A" had the following composition:

| Mix "A" | |
|---|---|
| Ingredient | Weight |
| Bread flour | 14 lbs |
| Egg yolk solids | 2 lbs |
| Shortening | 1 lb, 12 oz |
| Yeast | 8 oz |
| Salt | 4 oz |
| Baking Powder | 0.5 oz |
| PVP (K-15) (GAF Corp.) | 5 oz |

Then water in an amount of 8 lbs, 5 oz was added to the mix and blended in a 12 qt food mixer until a thick dough was obtained. The dough then was fermented for 80 min. at 81° F., scaled, and rolled into a ⅜" thick sheet. Donut shapes of 70 mm. diameter were hand-cut from the sheet.

Mix "B" was prepared in the same manner as Mix "A" except that PVP was omitted.

The donut shapes of Mixes A and B then were fully proofed for 1 hour. Thereafter 300 g. of each batch was separately deep fried in 1500 g. of frying fat at 370° F. for 1.5 min. per side, lifted out of the frying fat and drained of non-absorbed surface fat for 2 min. over the frying fat. After cooling, the finished donuts were analyzed for PVP, water and fat content. The results are shown below.

TABLE 1

| | Chemical Analysis | | | |
|---|---|---|---|---|
| Donut Formulation | % by wt. PVP | % by wt. Water | % by wt. Fat | % Fat Reduction |
| A | 1.2 | 25.8 | 18.2 | 30 |
| B | — | 26.5 | 25.8 | |

The analysis reveals that a 30% reduction in fat absorption is achieved in the finished donut with addition of only a 1.2% by wt. PVP content.

Both donut products also were evaluated for organoleptic properties of color, flavor and texture. The texture of donut A showed a more uniform network of gas cells in the core than in donut B. Each was light brown in color, had an egg/yeast flavor and was light (soft) in texture in the core.

EXAMPLE 2

Reduced Fat Cake Donuts from Batter

Two formulations of cake donut mixes were prepared from 350 g. of Dawn ® 3020 cake donut mix (Dawn Food Products, Jackson, MI). Formulation "C" included 5 g. of PVP (K-30) (GAF Corp.) which was dry blended into the mix for 1 hour. Formulation "D" did not contain any PVP. Then 140 ml. of water was added to each and the resulting batter was blended. Both were sheeted to ½" thickness, and hand-cut into donut shapes of 70 mm. diameter. Then 300 g. of each batch was deep fried in 1500 g. of frying fat at 375° C. for 2 ½ min. The donut products were lifted out of the frying fat and drained of non-absorbed, surface fat for 2 min. over the frying fat. After cooling, the finished donuts were analyzed and evaluated. The results are shown below.

TABLE 2

| | Chemical Analysis | | | |
|---|---|---|---|---|
| Donut Formulation | % by wt. PVP | % by wt. Water | % by wt. Fat | % Fat Reduction |
| C | 1.0 | 16.6 | 18.3 | 23 |
| D | — | 17.6 | 23.9 | |

The results demonstrate that a 23% reduction in fat is achieved with only 1% PVP in the finished donut. The organoleptic properties of Donut C was similar to Donut D.

EXAMPLE 3

The procedure of Example 1 was followed using 3.5 g. of PVP to provide a finished donut product having 0.7% by wt. PVP. The fat content was 17.6% by weight. A similar donut prepared without PVP had 22.9% fat content. The fat reduction achieved with 0.7% PVP was 23%.

Although the invention has been described with reference to certain embodiments thereof, it will be understood that changes and modifications may be made which are within the skill of the art. Accordingly, it is intended to be bound by the appended claims only, in which:

What is claimed is:

1. A process for preparing donuts having reduced fat and a substantially uniform texture which comprises providing a donut mix containing about 0.2–10% by weight of polyvinylpyrrolidone, blending with water to form batter, making donut shaped forms from said batter, and cooking said donut shaped forms by submersion in heated edible fat.

2. A process according to claim 1 wherein said donut mix is a raised donut mix which contains yeast leavening.

3. A process according to claim 1 wherein said donut mix is a cake donut mix which contains chemical leavening.

* * * * *